United States Patent [19]

Schwyter

[11] Patent Number: 5,051,190
[45] Date of Patent: Sep. 24, 1991

[54] PROCESS AND DEVICE FOR CLEANING SLAG FROM REFUSE INCINERATORS

[75] Inventor: Leo Schwyter, Sirnach, Switzerland
[73] Assignee: Leo Schwyter AG, Rikon im Tosstal, Switzerland
[21] Appl. No.: 459,784
[22] PCT Filed: May 18, 1989
[86] PCT No.: PCT/CH89/00089
  § 371 Date: Jan. 30, 1990
  § 102(e) Date: Jan. 30, 1990
[87] PCT Pub. No.: WO89/11912
  PCT Pub. Date: Dec. 14, 1989

[30] Foreign Application Priority Data

May 31, 1988 [CH] Switzerland ............ 2070/88

[51] Int. Cl.$^5$ ............................ B01D 21/00
[52] U.S. Cl. .................... 210/695; 210/772
[58] Field of Search ........... 210/769, 770, 771, 772, 210/695; 110/346, 212; 241/24, 29

[56] References Cited

U.S. PATENT DOCUMENTS 4,267,061  5/1981  Simo et al. .............. 210/772
4,350,597  9/1982  Selm et al. ............. 210/772 X
4,804,147  2/1989  Hooper ................... 241/24

FOREIGN PATENT DOCUMENTS 3700608 10/1987 Fed. Rep. of Germany .
3626885  2/1988 Fed. Rep. of Germany .

Primary Examiner—Frank Spear
Attorney, Agent, or Firm—Tarolli, Sundheim & Covell

[57] ABSTRACT

After quenching, the slag that is generated in garbage and waste incinerators is subjected to an additional washing process in a washer unit (2). During the wash process, harmful substances such as chlorides and heavy metals, for example, are washed out of the slag. The subsequent separation of the water from the slag is effected in a separator system (4) and in a drying system (7). The slag is dried to a maximum water content of 20% and the fine components with a grain size of less than 2 mm are removed from the slag either during or after the drying process. These fine components and the wash water sludge contain practically all the soluble harmful substances, and must be processed or dumped while observing special precautions. The remaining clean slag is practically free of soluble harmful substances and can be used as construction material.

21 Claims, 2 Drawing Sheets

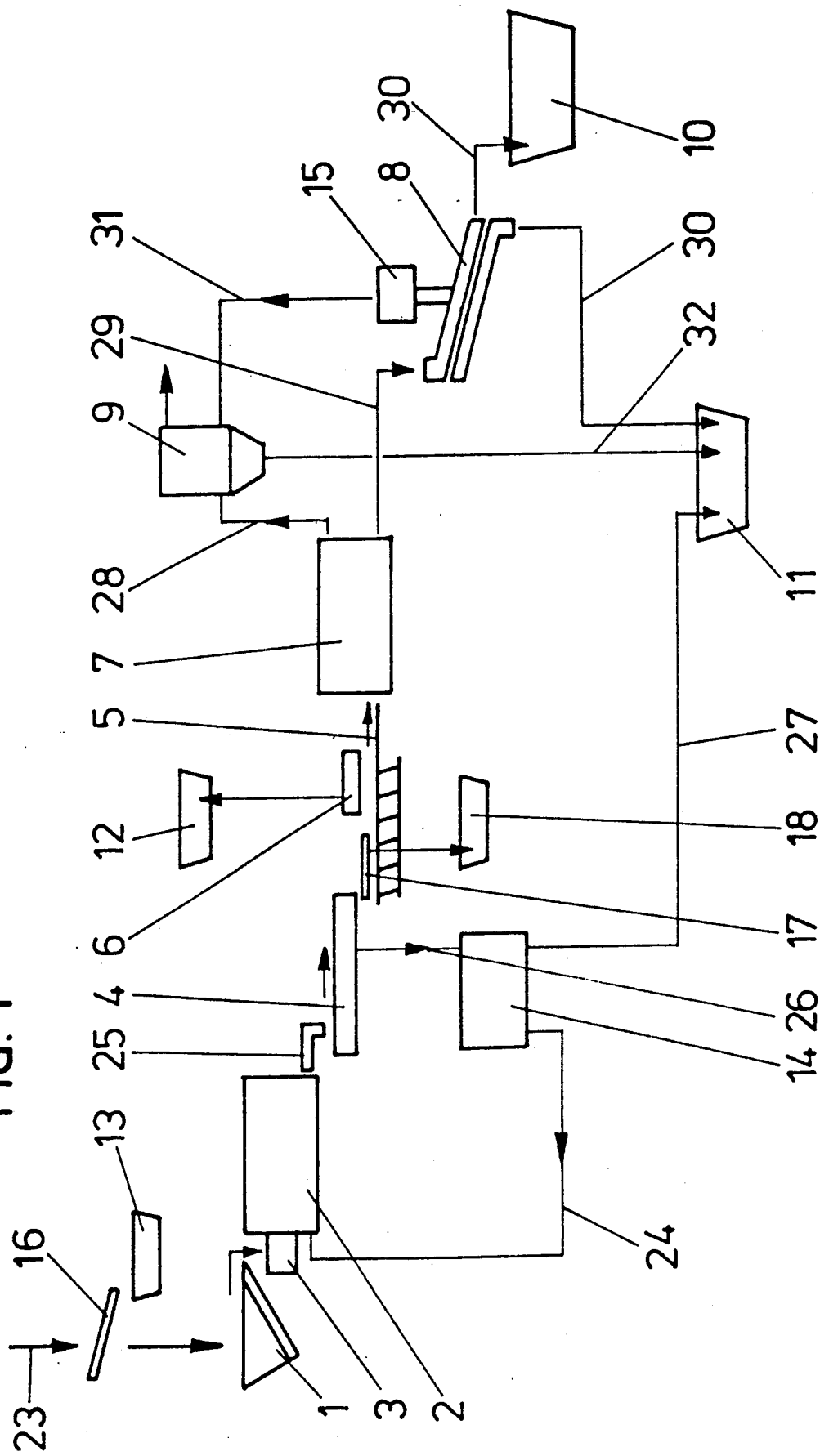

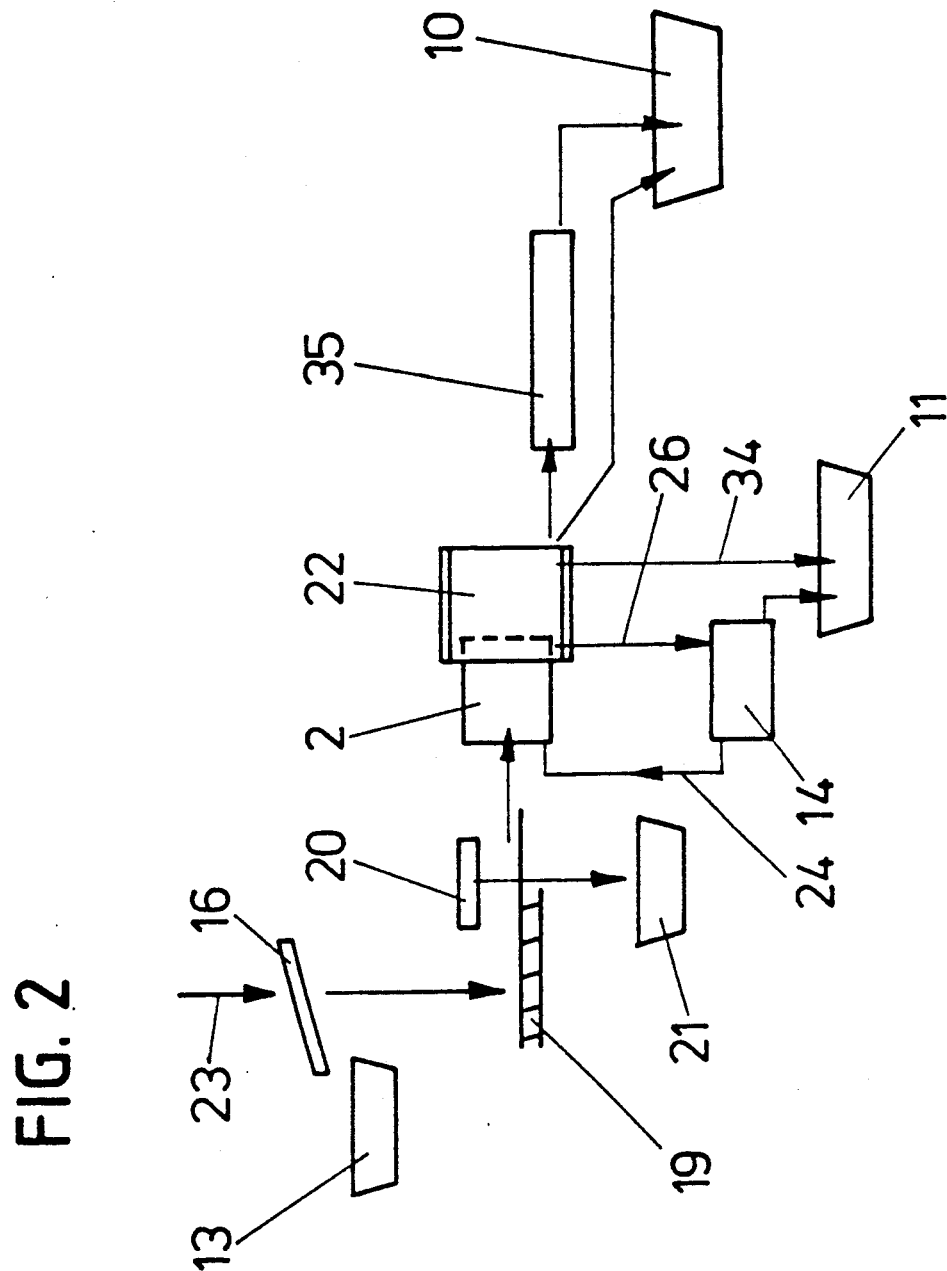

PROCESS AND DEVICE FOR CLEANING SLAG FROM REFUSE INCINERATORS

TECHNICAL FIELD

The present invention relates to a process for removing harmful substances and impurities from the slag from garbage and refuse incinerators, wherein after leaving the incinerator, the slag is quenched with water and then dried, and the dust is removed from the slag, and an apparatus for carrying out the process, and the use of the slag that has been cleaned by said process.

BACKGROUND ART

The secondary treatment of slag from garbage incinerator processes is already known. The journal *Umwelt-magazine* [Environment Magazine], Nov., 1985, pp. 30–32, describes a process used to minimize the quantity of slag produced. In this process, a so-called wet deslagger, within which the slag is cooled, is arranged beneath the furnace, i.e., at the end of the furnace grate. It is also noted that the content of heavy metals is also reduced by this wet deslagging. However, this reduction of the heavy-metal content is unsatisfactory, and considerable quantities of injurious substances remain in the slag. If it remains in the wet deslagger, the slag breaks down, and this causes additional difficulties during handling. The use of a wet deslagger has been known in other plants for a considerable time, wherein, in many instances, a water-filled slag channel is used. The cooled slag is moved to a slag bunker from this water-filled channel, where it is stored until finally dumped. Very high storage and transportation weights and, as a consequence of these, very high disposal costs result from the high water content in the slag.

Very large amounts of slag are generated because of the large quantities of garbage and waste that arrive in a garbage incinerators. This slag is usually disposed of in dumps. In a few instances, slag from garbage incinerators is also used in road construction or to build noise-abatement barriers. Approximately 30% of the weight of the garbage that arrives at an incinerator ends up as slag at the end of the incineration process. The dump or the use of this slag as road-construction material is in no way entirely free of risk, for considerable quantities of soluble and harmful substances remain in the slag. The slag can contain various quantities of these harmful substances, depending on the composition of the garbage that has been incinerated. On average, the content of harmful substances in slag produced from incinerators that burn domestic garbage can very in the range from 50–100 g per kg of slag. The harmful substances contained in the slag can include, in particular, chloride, lead, cadmium, zinc, iron, copper, and other impurities. Corresponding analyses have been published, for example, in *Schweizer Ingenieur und Architekt* [Swiss Engineer and Architect], Vol. 19, 1983. When slag from garbage incinerators is stored in dumps, leakage water has to be collected and disposed of, otherwise it constitutes a considerable environmental hazard. Similar problems arise when such slag is used for road construction, for which reason, in many instances the slag is mixed with cement and rendered impermeable to water. Since fewer and fewer dumps suitable for slag are available, the storage or dumping of such slag is causing major problems. The use of such slag in road construction is also being restricted to a small number of applications because of the formerly high contents of harmful substances.

The publication *Stuttgarter Berichte zur Abfallwirtschaft* [Stuttgart Reports on Waste Management], Berlin, 1984, pp. 221–246, asserts that the major part of water-soluble harmful substances is concentrated in fly dust, and it is recommended that only dust-free slag be used, for example, in road construction. DE 37 00 608 describes a process and an apparatus for processing slag, in which, after the slag has been quenched in a water bath, the fine components with a grain size of up to 1 mm are removed. The remaining slag has a reduced content of harmful substances and can be used for highway and road construction. The known processes for cleaning the slag still do not satisfy the increasing demands made on them. The slag that has been cleaned still contains residual components of water-soluble harmful substances. The chloride content can still amount to 50% of the original quantity, for example. The fact that the slag has to be stored after having been quenched in a water bath is also a disadvantage, for large storage capacities are still required. The harmful substances in the dust components are floated in the slag by the water bath and adhere to the pores after drying. The proposed drying to a residual moisture content of 1% requires considerable amounts of energy when large quantities of slag are involved. When dried to such an extent, the cleaned slag is not suitable for use as construction material and has to be rewetted in order to be used, for example, for highway and road construction.

SUMMARY OF THE INVENTION

For this reason, it is the task of the present invention to describe a process with which the slag that is produced in garbage incinerators can be cleaned mainly of the soluble harmful substances and dust components that it contains, and be so processed that it can be used as a construction material without posing any threat to the environment. The content of harmful substances is to be as low as possible. The process must make it possible to process the slag immediately after it leaves the incinerator, without the need for any intermediate storage. The apparatus used for this process is to be of a simple design and should make it possible to remove practically all the harmful substances from the slag. Once it has passed through the process and the apparatus, the slag should be suitable for use as construction material.

According to the present invention, this task has been solved in that the slag is mixed with additional wash water; harmful substances and fine components are washed out of the slag; the slag and the wash water are separated from each other; the slag is dried to a water content of at most 20%; and the fine components with maximum grain size of 2 mm are separated from the slag and removed.

When this process is used, an uncleaned slag which still only has a proportion of harmful substances that is 10 to 30% of the original quantity that was present after wet deslagging is produced. The lowest residual values are obtained with by intensive washing and are considerably below the standard values for road construction. The harmful substances that still remain in the slag are for all practical purposes completely in a bound, i.e., not water soluble form, and so do not pose a threat to the environment when the slag is reused. The wash process is relatively quick and easy to carry out, and offers considerable economies in time and energy in comparison to the other, known, process.

A preferred embodiment of the process according to the present invention is characterized in that the quantity of wash water that is additionally mixed with the slag amounts to at least three times the weight of the slag and/or the additional wash water that is mixed with the slag is heated to a maximum of 90° C. It has been found to be expedient that solvents and/or binding agents be mixed into the additional wash water. The use of this advantageous solution permits adaptation to the various composition of slags from garbage incinerators.

A preferred embodiment is that first the unbound water is separated from the slag and then the slag is dried to a maximum water content of 20% in a drying process. This division of the process for separating the additional wash water from slag makes it possible to save energy since the unbound wash water can be separated from the slag by dripping off or by being thrown off. In most instances, drying the slag to a water content of at most 20% requires the use of additional energy in that the slag is exposed to a partial vacuum or to heat. The drying process for improving the cleaning of the slag can be used in a very simple manner in that during the drying process used for the slag, unburned small and light particles are burned or annealed. In the most simple and known manner, this happens by the use of a drying process that makes use of naked flame.

A further improvement of the process can be achieved in that the fine components are separated from the slag simultaneously with the drying and/or immediately after the drying. A major proportion of the harmful substances are contained in the fine components of the slag that have a maximum grain size of 2 mm, e.g., approximately 75% of the lead or approximately 80% of the cadmium. It has also been found to be of advantage that after the removal of the fine components, additional substances are added to the slag. These additive substances improve the properties of the slag for subsequent use or serve as binding agents for any small, residual components of loose harmful substances that may still remain.

In an advantageous manner unburned coarse material and magnetic components are removed from the slag prior to mixing with the additional wash water and/or prior to drying. The unburned coarse material and the magnetic particles load the cleaning process since they can account for a 10 to 20% by weight of the quantity of slag that is in the slag channel after burning in the incinerator. For this reason, it is useful to remove such particles found in the slag from the treated slag as early in the process as possible, in particular before the use of additional energy.

The apparatus for carrying out the process according to the present invention comprises at least one metal-separation stage, a drying system, and a grading system, and is characterized in that it comprises a wash unit to mix the slag with wash water; a separator system for separating the wash water and sludge from the slag; a drying system for drying the slag; a fractionating unit for fractionating the slag into a first class of dust and a grain size of up to 2 mm and a second class of larger grains; and at least a coarse-material separator; and at least one magnetic separator system for separating magnetic substances, and in that all the structural units are connected to each other. In addition, a preferred embodiment is such that a coarse-material separator and a magnetic separator are arranged ahead of the wash unit; the separator system for the wash water is arranged in and/or immediately after the wash unit; this separator system forms a common structural unit with the fractionating unit for separating the fine components of the slag and is arranged immediately after the drying system. The apparatus according to the present invention permits the processing of slag from garbage incinerators, which is carried from the water bath in the slag channel. The apparatus can thus be immediately adjacent to the feed system or the slag can first be stored in a bunker and later moved for processing in the plant described heretofore. The structural elements used in the plant are known systems such as can be used in processing sand and gravel for underground or above ground construction, and for reprocessing moulding sand.

In this connection, it is expedient if the wash unit is a paddle-mill washer or a drum washer and the separating system used for separating the wash water and sludge consists of a dewatering trough or a pusher centrifuge. It is also expedient if the drying system is a dryer drum with a burner or annealing system, and the fractionating unit is a vibrating sieve with a mesh size of at most 2 mm and a suction system. A further improvement to the system can be achieved in that the fractionating unit is a wind sifter. The system can be made more compact in a very simple manner if the dryer system and the fractionating unit are combined into one structural unit. Most advantageously, the separation of the coarse material is effected in that the coarse-material separator is a sieve or a vibrating trough.

In addition, the object of the present invention is the use of slag that has been cleaned according to the present invention as construction material. This construction material can be used in road and highway construction, for sound barriers, or for other structural work.

BRIEF DESCRIPTION OF THE DRAWINGS

The foregoing and other features and advantages of the present invention will become apparent to one skilled in the art to which the present invention relates from reading the following description of preferred embodiments of the present invention in conjunction with the accompanying drawings, wherein:

FIG. 1 is a diagram showing a slag cleaning-system made up of individual component groups; and FIG. 2 is a diagram of a slag-cleaning system configured as a compact system.

DESCRIPTION OF PREFERRED EMBODIMENTS

The apparatus or plant shown in FIG. 1, which is used to clean slag from garbage incinerators, shows the individual components and the sequence of the particular process. The slag that is ejected from a garbage incinerator (not shown herein) is moved, at point 23, to a coarse-material separator 16. In the embodiment shown, this coarse-material separator comprises a coarse mesh or grid that can, if needs be, be vibrated. Unburned coarse particles and larger pieces of residual metal are picked up from this coarse-material separator and fall into a coarse-material collector trough 13. The slag itself falls through the coarse-material separator 16 and into a collector bunker 1. The slag moves from this collector bunker 1 through the feeder unit 3 and into a washer drum 2. This washer drum 2 operates continuously and within it the slag is thoroughly mixed with wash water. The wash water is fed into the washer drum 2 through the line 24. When this is done, the quantity of water is such that in the example shown, a quantity of water that is three times the weight of the slag that is throughput in the same time passes through the washer drum in unit time. At the output from the washer drum 2 the slag moves through the channel 25 into a water-removal channel 4. Within this water-removal channel 4 the unbound wash water, i.e., mainly the drop water is separated from the wet slag and delivered through a line 26 to a cleaning system 14. Within this cleaning system 14 the wash water is processed, i.e., the fine particles and sludge are removed from it, it is neutralized if necessary, and then passes through the line 24 and back into the circuit. The fine particles and sludge removed from the water are carried off to a harmful-substances bunker 11 along the line 27. Even this wash process removes a considerable quantity of harmful substances from the slag. When this is done, because of the protective wash process, the structure of the slag is not damaged, and the other components of the slag are neither dissolved nor softened.

From the water-removal trough 4, the washed slag moves to another coarse-material separator 17. This coarse-material separator 17 is incorporated if very high quality slag is required and, if this be the case, it is so configured that particles that have passed through the first coarse-material separator 16 are trapped in this second separator. The coarse material that is collected at this second coarse-material separator 17 passes into the coarse-material collector trough 18 and the slag passes onto the feed channel 5. A magnetic separator 6 is arranged above the feeder channel 5, and this removes all the magnetic components, i.e., the particles that contain iron, from the slag. The magnetic particles removed from the slag by the magnetic separator 6 pass into an iron-collection trough 12. Now the slag moves from the feed channel 5 into a drum-type dryer where it is dried to the point that its maximum water content amounts to a maximum 20%-wt. This reduction of the water content is needed so as to reduce the transportation weight of the slag that has been cleaned. In the example shown, hot air is used to dry the slag; this hot air can be produced during the garbage-incineration process and supplemented by additional heater units. The drum dryer is also heated by a burner, the naked flames of which are blown into the interior of the drum, where they generate the hot air that is needed. The high temperature ensures that small combustible fragments are burned or annealed. This makes it possible to reduce combustion losses of slag. The exhaust air that is formed in the drum dryer 7 during the drying process passes along the line 28 and into a filter 9, where suspended particles and dust are removed. At the end of the drum dryer 7 the now dry slag passes along the feed line 29 into a fractionating unit 8. This fractionating unit consists of a vibrating sieve with a mesh size of at most 2 mm. All the residual components of the slag that are smaller than 2 mm fall through this sieve and are transported along the line 30 into the harmful-substances bunker 11. A suction system 15 is arranged on this fractionating unit 8, and this draws air through the flow of slag so as to remove additional fine particles, which are smaller than 2 mm, from the slag, and move them along the line 31 and into the filter 9. The suspended particles and dust removed from the air by the filter 9 also pass through the line 32 and into the harmful-substances bunker 11. The clean slag is carried out from the outlet of the fractionating unit 8, through the feed unit 33, and into a slag bunker 10.

The slag that is collected in the slag bunker 10 contains only approximately 10 to 30% of the harmful substances originally contained in the slag at the feed point 23. This residual amount is totally bound into larger bodies of slag or else has formed chemical compounds with other substances, these compounds being harmless and, in particular, insoluble in water. The clean slag that arrives in the bunker 10 is thus problem-free when dumped or used as construction material, and poses no threat to the environment. The harmful substances originally contained in the slag have been collected in the harmful-substances bunker 11. This special waste in the harmful-substances bunker 11 must be processed or dumped under supervision. The degree of cleaning provided by the complete system can be varied by changing the quantity of wash water in the washer drum 2 and by matching the air flow and flow conditions in the slag bed in the fractionating unit 8 and in the drum dryer 7. Additional systems (not shown herein) to add solvents or binding agents to the wash water are incorporated in the line 24. Depending o the composition of the slag that has been introduced into the washer drum 2, the addition of substances of this kind can improve the cleaning process. The quantity of harmful waste that arrives in the harmful-substances bunker 11 is significantly smaller than the original quantity of slag, and depending on the slag and the cleaning efficiency of the plant will be somewhere in the range from 3 to 10% of the original weight of the slag. An additional 10 to 20% of the weight of the raw slag that is fed in at 23 falls into the collector troughs 12, 13, and 18 in the form of iron or coarse material and is passed on for processing and reuse. The process that has been described and the corresponding plant thus permit both a controlled handling of the slag and its division into usable components. The greatest proportion is formed by the cleaned slag with a proportion of approximately 70 to 85% of the original weight of the slag, and this major part can be used without any problems for roads, highways, noise-abatement barriers, and other structures.

The plant that is shown diagrammatically in FIG. 2 is a compact variation of the cleaning system. Here, too, the slag that is removed from the garbage incinerator is introduced into the coarse-material separator 16 at point 23. From the coarse-material separator 16, the coarse material falls into the coarse-material collector trough 13 and the slag moves onto a transport trough 19. A magnetic separator 20 is arranged in the vicinity of this transport trough 19; this removes all the components of the slag that contain iron from the flow of slag and moves them to an iron-collection trough 21. From this transport trough 19 the slag moves into the washer drum 2, which is supplied with wash water through the line 24, as described in connection with FIG. 1. A common structural unit 22 is arranged immediately after and in part within the washer drum 22; this group incorporates the separator system for the wash water and, at the same time, the fractionating unit for separating the fine components out of the slag. This structural group 22 is made up of known structural units, for example, in the form of a centrifuge in combination with a vibrating sieve. The wash water that is separated out in the structural group 22 passe along the line 26 into the cleaning system 14 for the wash water and the slag fraction that is smaller than 2 mm passes along the feed line 34 into the harmful-substances bunker 11. The slag that is processed in the common structural unit 22 already has a lower water content. Depending on the purpose for which it is to be used, it can be moved directly into the slag bunker 10 or passed over a drying bed 35. If the clean slag is to be used for road construction, it should have a water content of approximately 10% in order that it can be properly consolidated. This moisture content can be adjusted by way of the time spent over the drying bed 35. In this plant, the quantities of waste that arrives in the troughs 11, 13, and 21 move in the same weight ratios as in FIG. 1. It should be noted that the cited weight proportions can vary considerably, particularly as a function of the water content of the slag that is introduced at point 23, the composition of the garbage or waste that is involved, and the quality of the incineration process within the furnace.

This invention has been described above with reference to preferred embodiments. Modifications and changes may become apparent to one skilled in the art upon reading and understanding this specification. It is intended to cover all such modifications and changes within the scope of the appended claims.

Having described preferred embodiments of the invention, I claim:

1. A process for removing harmful substances and impurities from the slag emanating from garbage and waste incinerators, the slag being quenched with water after it leaves the incinerator and the dust component being separated from the slag, wherein after being quenched the slag is mixed with additional water, harmful substances and wash water are separated from each other, and the slag is dried to a maximum water content of 20%, and the fine components with a grain size of at most 2 mm are separated and removed from the slag.

2. A process as defined in claim 1, wherein the quantity of wash water that is additionally mixed with the slag amounts to at least three times the weight of the slag.

3. A process as defined in claim 1, wherein the quantity of wash water that is additionally mixed with the slag is heated to a maximum of 90° C.

4. A process as defined in claim 1, wherein solvents and/or binding agents are mixed into the additional wash water.

5. A process as defined in claim 1, wherein the unbound wash water is first separated from the slag and then the slag is dried in a drying process to a maximum water content of 20%.

6. A process as defined in claim 1, wherein unburned small and light particles are burned or annealed during the drying process for the slag.

7. A process as defined in claim 1, wherein the fine components are separated from the slag simultaneously with the drying and/or immediately after the drying.

8. A process as defined in claim 1, wherein additives are mixed with the slag after the removal of the fine components.

9. A process as defined in claim 1, wherein the unburned coarse material and the magnetic components are removed from the slag prior to the additional wash water being mixed in.

10. A process as defined in claim 1, wherein the unburned coarse material and the magnetic components are removed from the slag prior to drying.

11. A slag cleaning system for carrying out the process as in claim 1, with a metal separator system, a drying system, and a grading system, said system incorporating a washer unit (2) for mixing the slag with wash water; a separator system (4) for separating wash water and sludge from the slag; a drying system (7) for drying the slag; a fractionating unit (8) for fractionating the slag into a first class of dust and a grain size of up to 2 mm, and a second class of larger grain; and at least one coarse-material separator (16, 17); and at least one magnetic separation system (6) for separating magnetic substances, all the structural groups being connected to each other.

12. A slag cleaning system as defined in claim 11, wherein a coarse-material separator (16) and a magnetic separator (20) are arranged ahead of the washer unit (2), the separator system for the wash water is in and/or directly after the washer unit (2), and this separator system (4) forms a common structural group (22) with the fractionating unit for separating the fine components of the slag and is arranged immediately after the drying system (7).

13. A slag cleaning system as defined in claim 11, wherein the washer unit (2) is a water bath with a paddle-mill washer or a drum washer.

14. A slag cleaning system as defined in claim 11, wherein the separator system (4) for separating the wash water and sludge comprises a water-removal trough or a push centrifuge.

15. A slag cleaning system as defined in claim 11, wherein the drying system (7) is a dryer drum with a burner or annealing system.

16. A slag cleaning system as defined in claim 11, wherein the fractionating unit (8) is a vibrating sieve with a mesh size of at most 2 mm and a suction system (15).

17. A slag cleaning system as defined in claim 11, wherein the fractionating unit (8) is a wind sieve.

18. A slag cleaning system as defined in claim 11, wherein the dryer system (7) and the fractionating unit (8) are combined in one structural group.

19. A slag cleaning system as defined in claim 11, wherein the coarse-material separator (16, 17) is a sieve or a vibrating sieve.

20. The use of slag, cleaning as in claim 1, as construction material.

21. A process for removing harmful substances and impurities from slag enamating from garbage and waste incinerators, the process comprising the steps of:
   quenching the slag with water after the slag leaves the incinerator;
   separating any dust component from the slag;
   mixing the slag with additional water after the slag is quenched to wash harmful substances from the slag;
   separating harmful substances and the wash water from each other;
   drying the slag to a maximum water content of 20%; and
   separating and removing fine components with a grain size of at most 2 mm from the slag.

* * * * *

UNITED STATES PATENT AND TRADEMARK OFFICE
CERTIFICATE OF CORRECTION

PATENT NO. : 5,051,190

DATED : September 24, 1991

INVENTOR(S) : Leo Schwyter

It is certified that error appears in the above-identified patent and that said Letters Patent is hereby corrected as shown below:

Column 8, line 48, claim 20, change "cleaning" to --cleaned--.

Signed and Sealed this

Second Day of March, 1993

Attest:

STEPHEN G. KUNIN

*Attesting Officer*      Acting Commissioner of Patents and Trademarks